(12) United States Patent
Shah

(10) Patent No.: US 11,651,459 B2
(45) Date of Patent: *May 16, 2023

(54) COMPUTER-CONTROLLED PRECISION EDUCATION AND TRAINING

(71) Applicant: Netspective Communications LLC, Silver Spring, MD (US)

(72) Inventor: Shahid N. Shah, Silver Spring, MD (US)

(73) Assignee: Netspective Communications LLC, Silver Spring, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/865,173

(22) Filed: Jul. 14, 2022

(65) Prior Publication Data

US 2022/0351316 A1 Nov. 3, 2022

Related U.S. Application Data

(63) Continuation of application No. 16/712,213, filed on Dec. 12, 2019, now Pat. No. 11,423,500.

(51) Int. Cl.
*G06Q 50/20* (2012.01)
*G06Q 10/06* (2012.01)
(Continued)

(52) U.S. Cl.
CPC ........... *G06Q 50/205* (2013.01); *G06F 16/27* (2019.01); *G06N 20/00* (2019.01);
(Continued)

(58) Field of Classification Search
CPC ...... G06F 16/27; G06F 16/273; G06F 16/275; G06F 16/278; G09B 19/003; H04L 65/60;
(Continued)

(56) References Cited

U.S. PATENT DOCUMENTS

| 6,606,480 B1 | 8/2003 | L'Allier et al. |
| 8,938,450 B2 | 1/2015 | Spivack et al. |

(Continued)

*Primary Examiner* — Wing F Chan
*Assistant Examiner* — Billy H Ng
(74) *Attorney, Agent, or Firm* — Rahman LLC

(57) ABSTRACT

A system for streaming of contextual micro-content blocks for a workflow task to facilitate task performance by a user. The system includes a context sensing engine that processes one or more context inputs and generates an output based on the context inputs received from a front-end context monitoring appliance. The system includes a processing circuit having a navigation engine to navigate through digital information sources and search for information that matches one or more parameters of relevance for the workflow task. The processing circuit extracts computer-executable information files from the digital information sources that matches the one or more parameters of relevance for the workflow task and digitally processes the collected computer-executable information files into processed information blocks. The processing circuit includes a micro-content blocks creator for generating the contextual micro-content blocks from the processed information blocks. The micro-content blocks are delivered to the user when the micro-tasks are beginning.

17 Claims, 5 Drawing Sheets

(51) Int. Cl.
*G06N 20/00* (2019.01)
*G09B 19/00* (2006.01)
*H04L 65/60* (2022.01)
*G06F 16/27* (2019.01)
*G01S 19/13* (2010.01)
*G06Q 10/0633* (2023.01)
*G06Q 10/0631* (2023.01)

(52) U.S. Cl.
CPC . *G06Q 10/0633* (2013.01); *G06Q 10/063112* (2013.01); *G06Q 10/063114* (2013.01); *G09B 19/003* (2013.01); *H04L 65/60* (2013.01); *G01S 19/13* (2013.01)

(58) Field of Classification Search
CPC .................. G01S 19/13; G06Q 50/205; G06Q 10/063112
See application file for complete search history.

(56) References Cited

U.S. PATENT DOCUMENTS

| | | | |
|---|---|---|---|
| 9,304,989 | B2 | 4/2016 | Spivack et al. |
| 9,324,247 | B2 | 4/2016 | Eggert et al. |
| 10,276,263 | B2 | 4/2019 | Connely, IV et al. |
| 2004/0115608 | A1 | 6/2004 | Meyer et al. |
| 2013/0275156 | A1 | 10/2013 | Kinkaid et al. |
| 2014/0074545 | A1 | 3/2014 | Minder et al. |
| 2014/0204190 | A1 | 7/2014 | Rosenblatt, III et al. |
| 2014/0278640 | A1* | 9/2014 | Galloway ...... G06Q 10/063114 705/7.15 |
| 2015/0324472 | A1* | 11/2015 | Bahrami ................... G06F 7/36 707/740 |
| 2016/0112362 | A1* | 4/2016 | Perazzo ................ H04L 51/046 455/466 |

* cited by examiner

COMPUTER-CONTROLLED PRECISION EDUCATION AND TRAINING

CROSS-REFERENCE TO RELATED APPLICATIONS

This application is a continuation of U.S. patent application Ser. No. 16/712,213 filed on Dec. 12, 2019, the complete disclosure of which, in its entirety, is hereby incorporated by reference.

BACKGROUND

Technical Field

The embodiments herein generally relate to computerized Internet-based education and training systems, and more particularly to a computer-controlled remote-based learning system for facilitating execution of workflow tasks.

Description of the Related Art

Schools are a great way of learning and training. However, several modern technology requirements and environments for training systems are dependent on its context and reference. This means someone may not need to be taught everything in all possible ways. The context demands at least some level of customization for the training and education delivery process in a digital environment.

Therefore, there is a need of a new intelligent and evolved digital system for education and training that more efficiently allows execution of certain workflow tasks requiring training and education.

SUMMARY

In view of the foregoing, an embodiment herein provides a system for live digital streaming of one or more contextual micro-content blocks in real-time for a workflow task to facilitate task performance by a user. The system includes a context sensing engine that processes one or more context inputs associated with the user and converts them into processed inputs, and generates an output based on the one or more context inputs received from a front-end context monitoring appliance. The front-end context monitoring appliance is communicatively coupled to the context sensing engine at a remote location and includes a context sensor that detects a context of the task performance and a Global Positioning Service (GPS) device that detects geographical coordinates of a device associated with the user. The system further includes a processing circuit. The processing circuit includes a navigation engine that navigates through one or more digital information sources accessible over a network and searches for information that matches one or more parameters of relevance for the workflow task. The processing circuit further includes a computerized data collection wireless appliance that extracts computer-executable information files from the one or more digital information sources that matches the one or more parameters of relevance for the workflow task. The processing circuit further includes an information processing engine communicatively coupled to the computerized data collection wireless appliance. The information process engine digitally processes the collected computer-executable information files into a plurality of processed information blocks. The processing circuit further includes a micro-content blocks creator that generates the one or more contextual micro-content blocks from the plurality of processed information blocks based on the output generated by the context sensing engine. The system further includes a micro-content communication component that transmits the one or more contextual micro-content blocks relating to the workflow task to the device associated with the user at a time when the plurality of micro-tasks of the workflow task are about to start.

The system may further include an AI/ML (artificial intelligence/machine learning) system remotely connected to the front-end context monitoring appliance and communicatively coupled to the context sensing engine. The AI/ML system may receive a signal from the context sensing engine containing the processed context inputs and the output generated based on the context inputs, process the context inputs to determine a contextual pattern for the workflow task utilizing a plurality of intelligent and machine learning-based tools, and transmit a digital signal containing information pertinent to the contextual pattern to the processor.

The processing circuit may further include a filtering circuit that filters the plurality of processed information blocks based on the contextual pattern associated with the user and the workflow task as indicative through the output generated by the context sensing engine communicatively coupled to the processing circuit and the AI/ML system.

The one or more micro-content blocks may include at least one of a context-based micro-content block, a location-based micro-content block, a role-based micro-content block, and a skills-based micro-content block such that the one or more contextual micro-content blocks matches to a plurality of micro-tasks of the workflow task.

The one or more contextual micro-content blocks may be time-stamped before transmission by the micro-content communication component to the device associated with the user for real-time delivery according to an occurrence of the plurality of micro-tasks of the workflow task.

The one or more parameters of relevance may be defined based on one or more of a plurality of digital inputs stored in a memory device, the plurality of digital inputs including a digital input indicative of nature of the workflow task, a digital input indicative of specific micro-tasks associated with the workflow task, a digital input indicative of location of execution or performance of the workflow task, a digital input indicative of actor performing the task, a digital input indicative of context of the workflow task, a digital input indicative of skill-sets of the actor performing the workflow task, a digital input indicative of role of the actor performing the workflow task.

The GPS device may retrieve real-time tracking location coordinates associated with an event occurrence for the plurality of micro-tasks of the workflow task. The GPS device may include a radio-navigation system.

The front-end context monitoring appliance may include an agent device coupled communicatively and operatively with the context sensing engine.

The agent device may be operated by deploying an installable agent, configured as a browser plugin, at the device associated with the user.

The system may further include a blockchain device that interacts with the context sensing engine through a plurality of blockchain configured distributed access points over a blockchain network.

The blockchain device may include a distributed trusted ledgers system containing a plurality of distributed blockchain ledgers associated with a plurality of computing terminals such that each ledger stores a copy of a computer-executable file containing the context inputs and the one or more contextual micro-content blocks associated with the workflow task.

The blockchain device may include a blockchain database that stores the collected computer-executable information files from the one or more digital information sources and the one or more contextual micro-content blocks.

Another embodiment herein provides a blockchain-enabled information management server for live digital streaming of one or more contextual micro-content blocks in real-time for a workflow task to facilitate task performance by a user. The information management server includes a context sensing engine that may process one or more context inputs associated with the user and convert them into processed inputs, and generate an output based on the one or more context inputs received from a front-end context monitoring appliance. The front-end context monitoring appliance may be communicatively coupled to the context sensing engine at a remote location. The front-end context monitoring appliance may include a context sensor that detects a context of the task performance and a GPS device that detects geographical coordinates of a device associated with the user. The system further includes a processing circuit. The processing circuit includes a navigation engine that navigates through one or more digital information sources accessible over a network and searches for information that matches one or more parameters of relevance for the workflow task. The processing circuit further includes a computerized data collection wireless appliance that extracts computer-executable information files from the one or more digital information sources that matches the one or more parameters of relevance for the workflow task. The processing circuit includes an information processing engine communicatively coupled to the computerized data collection wireless appliance. The information processing engine digitally processes the collected computer-executable information files into a plurality of processed information blocks. The processing circuit includes a micro-content blocks creator for generating the one or more contextual micro-content blocks from the plurality of processed information blocks based on the output generated by the context sensing engine.

The system further includes a micro-content communication component that transmits the one or more contextual micro-content blocks relating to the workflow task to the device associated with the user at a time when the plurality of micro-tasks of the workflow task are about to start. The system further includes a blockchain device that interacts with the context sensing engine through a plurality of blockchain configured distributed access points over a blockchain network.

The blockchain device may include a distributed trusted ledgers system containing a plurality of distributed blockchain ledgers associated with a plurality of computing terminals such that each ledger stores a copy of a computer-executable file containing the context inputs and the one or more contextual micro-content blocks associated with the workflow task.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

Figure 1:
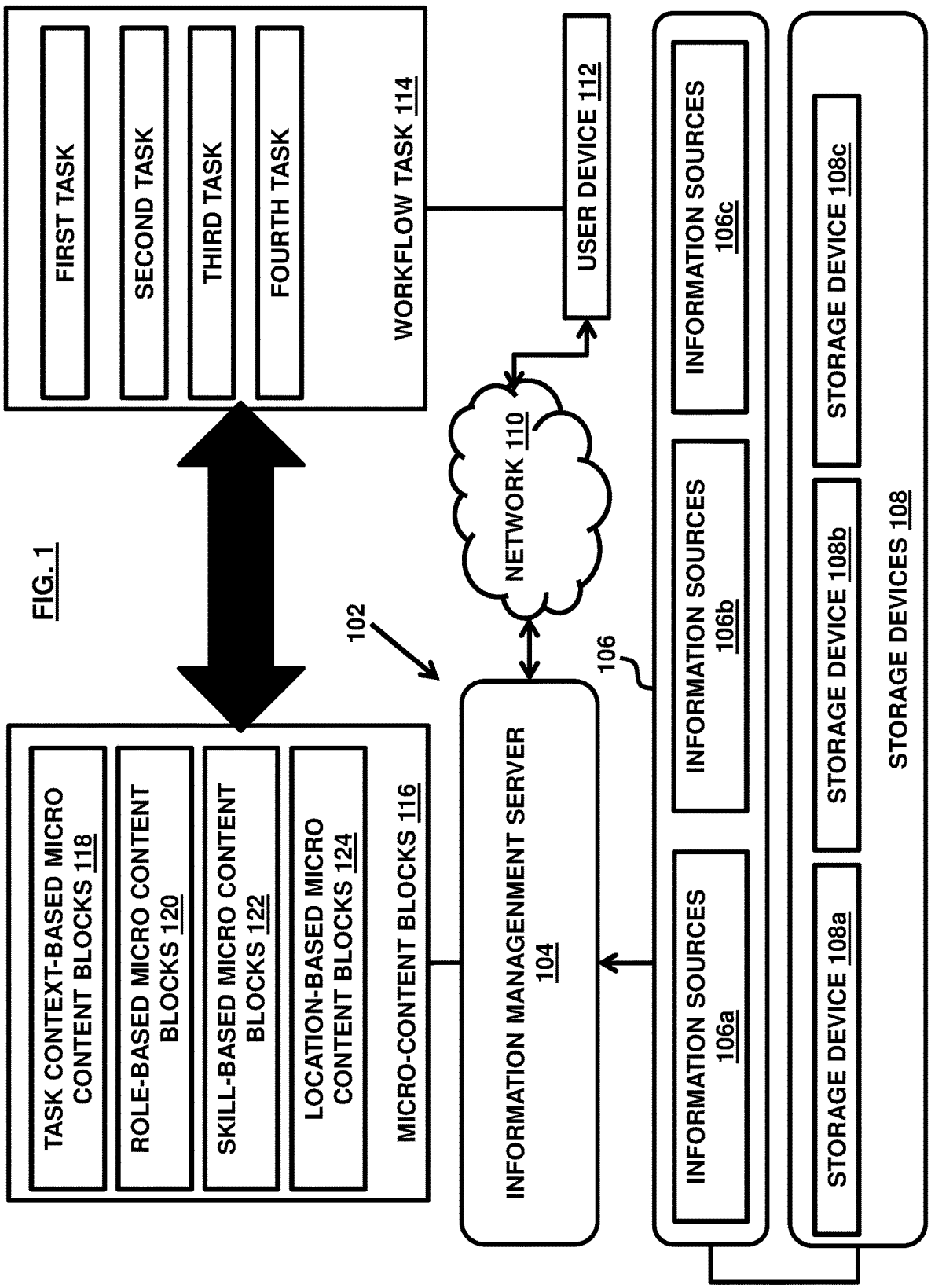
FIG. 1 illustrates an example of a computer architecture in which various embodiments herein may operate.

The embodiments herein and the various features and advantageous details thereof are explained more fully with reference to the non-limiting embodiments that are illustrated in the accompanying drawings and detailed in the following description. Descriptions of well-known components are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring now to the drawings, and more particularly to FIGS. 1 through 5, where similar reference characters denote corresponding features consistently throughout the figures, there are shown preferred embodiments. In the drawings, the size and relative sizes of components, layers, and regions, etc. may be exaggerated for clarity.

FIG. 1 illustrates an example of a computer architecture in which various embodiments herein may operate. The computer architecture may include a system 102 for live digital streaming of one or more contextual micro-content blocks in real-time for a workflow task 114 to facilitate task performance by a user. The system 102 may include an information management server 104 configured for navigating through a plurality of information sources 106a, 106b, and 106c (collectively referred to as information sources 106, for the purpose of description) distributed remotely from one another and storing digital files executable by a computer (such as the information management server 104) in a plurality of respective storage devices such as a storage device 108a, a storage device 108b, and a storage device 108c collectively referred to as storage devices 108, for the purpose of description. An information source of the information sources 106 may store its respective digital files in one or more storage devices 108 that are associated with the respective information source. The information sources 106 and the storage devices 108 shown in FIG. 1 are for illustration purposes only, otherwise the number of information sources 106 and the number of storage systems 108 may be different. In some embodiments, there may be large number of information sources 106 and storage systems 108 and a different number of information sources 106 compared with the storage systems 108.

The information management server 104 may be connected to user devices associated with a plurality of users. As an example, for the purpose of describing an embodiment, the information management server 104 is shown to be communicatively connected with one user device 112 through a communication network 110, such as the Internet or an Intranet. The user may perform a workflow task at a particular time and location such that the performance of the workflow task (alternatively referred to as a "task" without limitations herein) 114 occurs at a location remote from the location of the information management server 104. The user device 112 is associated with the user and is also located remote from the information management server 104.

The workflow task 114 may involve a series of tasks called micro-tasks such as a first task, a second task, a third task, and a fourth task, etc. without limitations in number. Each of these micro-tasks may be performed in a particular sequence at particular locations and particular time slots. These micro-tasks may be independent of one another, or totally or partially dependent on at least some of the other micro-tasks.

Figure 3:
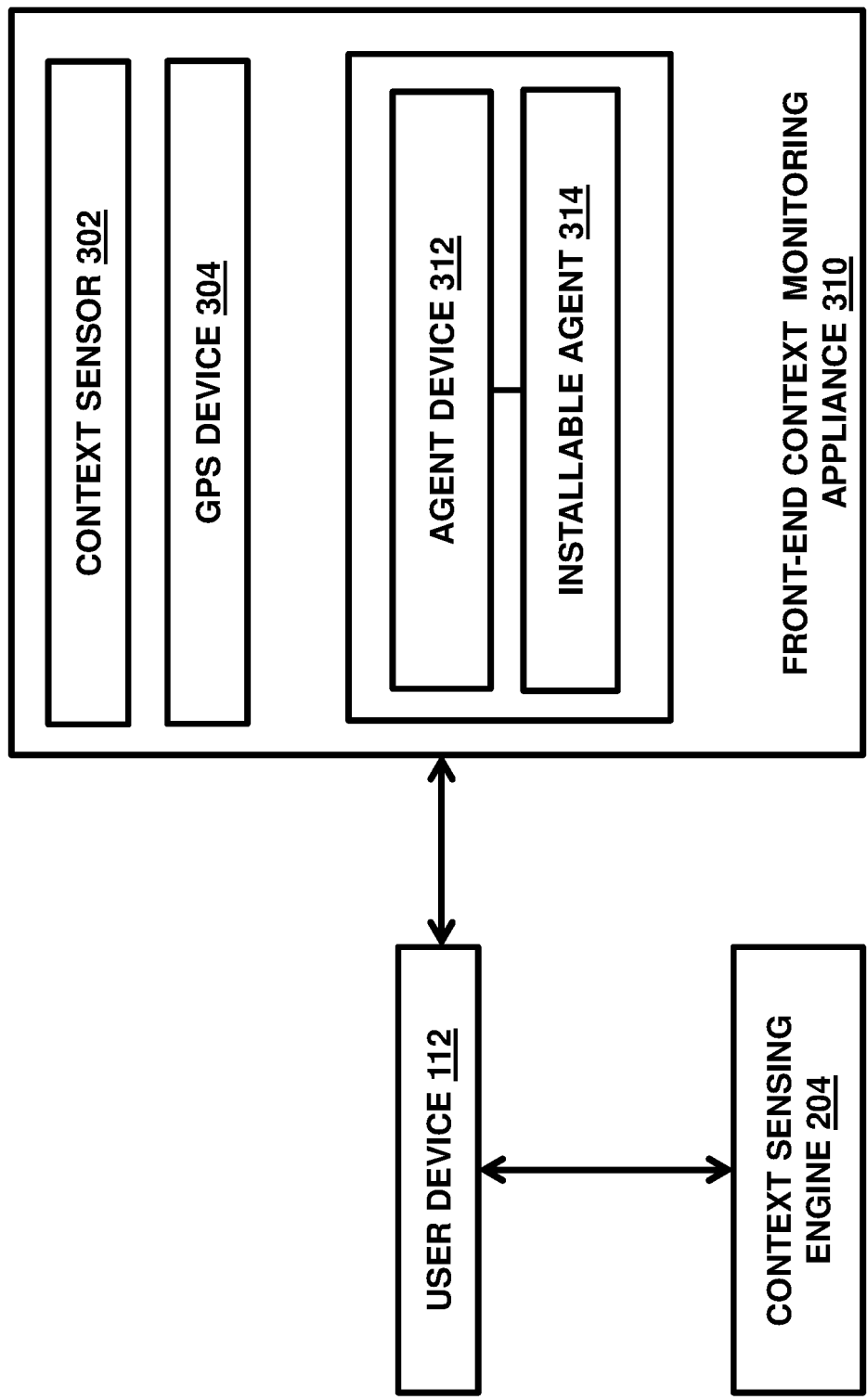
FIG. 3 illustrates a front-end context monitoring appliance connected with a context sensing engine in accordance with an embodiment herein.

The information management server 104 may be configured to monitor and receive details pertinent to the workflow task 114 based on certain inputs received from the user device 112 and/or based on certain automated transfer of digital messages from the user device 112 and its associated sensors and monitoring agents such as a front-end context monitoring appliance 310 as shown in FIG. 3 and described later. The information management server 104 may serve the user device 112 one or more micro-content blocks 116 based on the inputs received and/or the digital messages, which may be indicative of the workflow task 114 along with associated respective micro-tasks and the context of the user device 112, user, and the performance of the workflow task 114 (referred to as contextual patterns).

The micro-content blocks 116 may be of a variety of types based on the types of contextual patterns associated with the user device 112 and the workflow task 114. For example, the micro-content blocks 116 may include at least one or more task context-based micro-content blocks 118, one or more role-based micro-content blocks 120, one or more skill-based micro-content blocks 122, and one or more location-based micro-content blocks 124. In an example, the various micro-content blocks 116 may include information elements generated by mapping onto each micro-task for relevancy, the role of the user interacting for executing a specific micro-task for relevancy, and the level of experience or skill sets of the user for a particular micro-task that is contained within the workflow task 114 such that the one or more contextual micro-content blocks 116 match to the plurality of micro-tasks of the workflow task. Therefore, the various micro-content blocks 116 provides a set of structured digital information blocks that are relevant and related and deeply maps onto various micro-tasks when looked in association with the skillets of the user, location of the user, nature of micro-tasks and the overall workflow task 114, role of the user in various micro-tasks, and the like. The micro content blocks 116 are further discussed below.

The illustrated information sources 106 may include online web sources and databases connected over the Internet, an electronic medical record (EHR), a medical information exchange (HIE), an image archiving communication system storing images, other localized but accessible data stores and the like without limitations. The information sources 106 provide various types of digital information including medical information to the information management server 104. For example, EHRs and web pages can each provide information such as medical information, diagnostic information, radiographs, and the like.

Figure 2:
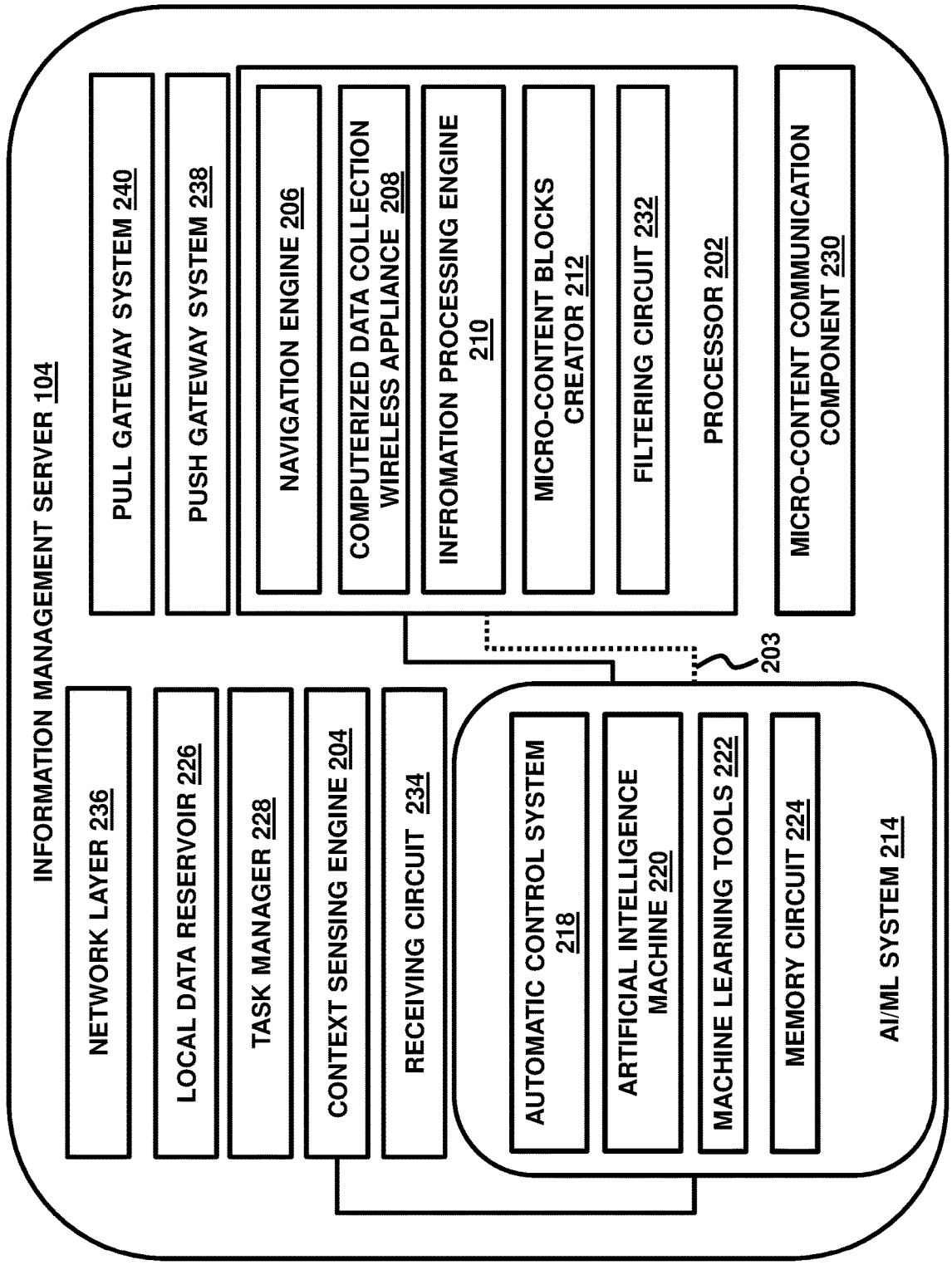
FIG. 2 illustrates a schematic diagram of an information management server in accordance with an embodiment herein.

FIG. 2, with reference to FIG. 1, illustrates a schematic diagram of the information management server 104 in an embodiment. The information management server 104 may include a processing circuit also referred to as a processor 202 interchangeably and a context sensing engine 204. The processing circuit 202 may include a navigation engine 206, a computerized data collection wireless appliance 208, an information processing engine 210, and a micro-content blocks generator 212. The processing circuit 202 is configured to perform a variety of specialized processing tasks including navigating for relevant information, extracting the relevant information from the plurality of distributed information sources 106, and creating information elements called micro-information blocks as will be discussed later for delivery to the user device 112 in accordance with the execution or performance of the specific micro tasks. The processing circuit 202 may be capable of executing pre-programmed instructions for performing specialized tasks associated with operation of the information management server 104. The various components of the processing circuit 202 are discussed hereafter in the document.

The processor 202 receives a portion of the digital information that the information management server 104 identifies as relevant and performs specific tasks for processing such as but not limited to indexing, semantic meta tagging, matching, relevancy checking, curating, summarizing, indexing, organizing, processing, standardizing, transforming into micro-content blocks etc.

The navigation engine 206 is configured to navigate through one or more of the digital information sources 106 accessible over the network 110 and search for the digital information that matches one or more parameters of relevance for the workflow task 114. The navigation engine 206 may crawl through millions of web pages and other localized repositories for searching relevant information. The one or more parameters of relevance may be defined based on the nature and context of the workflow task 114, specific micro-tasks associated with the workflow task 114, location of execution or performance of the workflow task 114, actor performing the workflow task 114, context of the workflow task 114, skill-sets of the person performing the workflow task 114, role of the person performing the workflow task 114, and the like, each indicated through a respective digital input. These parameters may together be indicative of a contextual pattern for the workflow task 114. An AI/ML (artificial intelligence/machine learning) system 214 may utilize the various parameters of relevance associated with the workflow task 114 and create a unified score for determining the contextual pattern associated with the workflow task 114. The AI/ML system 214 is communicatively coupled to the context sensing engine 204 and the processor 202.

The contextual pattern may be determined based on one or more context inputs received and processed by the context sensing engine 204 as monitored by the front-end context monitoring appliance 310 (shown in FIG. 3). The context sensing engine 204 may be configured to process the one or more context inputs associated with the workflow task 114 (including associated user and systems) and generate an output signal based on the one or more context inputs. The context sensing engine 204 may include or be coupled to a receiving circuit 234 to receive the one or more context inputs including any manually provided user inputs indicative of the user behaviour etc. The context sensing engine 204 may utilize the context inputs obtained from signals received from the front-end context monitoring appliance 310 (of FIG. 3) indicative of the context in which the workflow task 114 is being performed.

As illustrated in FIG. 3, with reference to FIGS. 1 and 2, the front-end context monitoring appliance 310 may include a context sensor 302 to detect a context of the task performance, and a GPS device 304 to detect geographical coordinates of a user device 306 associated with the user.

The Global Positioning Service (GPS) device 304 of the front-end context monitoring appliance 310 may help in real-time tracking of location coordinates associated with various event occurrences or performance of the workflow task 114 or respective micro-tasks by collecting their location details. Real-time tracking may offer different challenges in the tracking of the event occurrences or tasks depending on the complexity of the event occurrences when it is performed manually and takes time, resources and manpower. Location data may be collected in most cases by the GPS device 304 using, for example, a radio-navigation system; though in some other specific cases different location technologies can be used. For example, in an ambulance service of a hospital, the GPS device 304 may help in real-time tracking of a patient being transferred, journey reports, stop reports, alerts, and scheduled reports for future and associated tasks performed by different participants.

The front-end context monitoring appliance 310 may include an agent device 312 that may be coupled communicatively and operatively with the information management server 104. Similar agent devices may be coupled with or deployed at other devices too that may be connected with the information management server 104. The agent device 312 may be operated by deploying an installable agent 314 at the user device 306. In an example, the installable agent 314 may be defined in the form of a browser plugin installed by a user on the user device 306.

The processor 202 and the context sensing engine 204 are communicatively connected with the AI/ML system 214 in an embodiment. In an embodiment, the AI/ML system 214 may be an integral part of the processor 202 or the context sensing engine 204. In accordance with an embodiment, the AI/ML system 214 may receive a signal from the context sensing engine 204 containing the processed context inputs. The AI/ML system 214 may process the context inputs to determine a contextual pattern for the workflow task 114 utilizing a plurality of intelligent and machine learning-based tools. The AI/ML system 214 may include an automatic control system 218, an artificial intelligence machine 220, and machine learning tools 222. These components are discussed below.

In an example, the AI/ML system 214 may allow decision-making and determining the contextual pattern of the workflow task 114 based on real-time evidence as generated by the context sensing engine 204 utilizing and processing the context inputs received from the front-end context monitoring appliance 310. The real-time evidence may be generated based on the context inputs monitored by the context sensor 302, GPS device 304, and other devices. The context inputs allow the AI/ML system 214 to perform complex decision-making tasks to determine the contextual pattern associated with the workflow task 114. The AI/ML system 214 may perform simple and tactical tasks smartly in the absence of humans with the use of the artificial intelligence machine 220 and the machine learning tools 222 because the computer-executable context inputs are trustworthy and are obtained through direct environments associated with the user, user device 306, and the workflow task scenario. The AI/ML system 214 may generate the contextual pattern using certain predefined computer-executable rules that may be defined either by human manually or generated by the network 110 and/or based on learning by the AI/ML system 214 based on past transactions and operations over time. The contextual pattern may be indicative of the actual situation in which the workflow task 114 and its associated user may behave while performing the workflow task 114 or the challenges that may come across in task execution or the learning and training that the user may require for performing the workflow task 114 or respective micro-tasks effectively. Accordingly, appropriate steps may be taken by the processor 202 for ensuring necessary support is provided to the user or the user device 306 at the right time.

In an example, the AI/ML system 214 may perform an automated analysis of the context inputs to determine the contextual pattern. The AI/ML system 214 may generate AWL-based predictions of future expected behavior and learning requirements by the user using the artificial intelligence machine 220 and the machine learning tools 222 to timely guide at appropriate time in advance when certain information is required by the user. The artificial intelligence machine 220 is configured to generate an output (such as the contextual pattern) smartly using a set of inputs such as the context inputs so that the generated output address requirements of the user for executing a task more precisely and accurately in a real-time scenario. In the process, the artificial intelligence machine 220 utilizes the machine learning tools 222. The machine learning tools 222 are configured to train the artificial intelligence machine 220 how to learn over time with more repeat requests for the micro content blocks by different users in different contexts performing different types of tasks. The machine learning tools 222 are given access to data and allowed to learn on its own based on historical records and processing etc.

In an example, the AI/ML system 214 may carry out a predetermined inference on the basis of the aggregated context inputs, and take action in accordance with certain inference results generated as a result of the analysis by the AI/ML system 214. The automatic control system 218 may be provided and adapted for a target action to be taken by the artificial intelligence machine 220 of the AI/ML system 214 on the basis of the aggregated context inputs and the inference results and generate a control output for taking a target action such as generating the micro-content blocks 116 as will be discussed later. In an example, the AI/ML system 214 may be adapted to drive the artificial intelligence machine 220 on the basis of the inference results and the control output for past events stored in a memory circuit 224.

The AI/ML system 214 may generate the contextual pattern and transmit a digital signal 203 containing information pertinent to the contextual pattern to the processor 202. The processor 202 may perform a set of processing tasks as described herein.

As discussed above, the pages and other data repositories are crawled by the navigation engine 206 to identify the relevant information in view of the workflow task 114 based on the one or more parameters of relevance. The processor 202 includes the computerized data collection wireless appliance 208 that is configured to extract computer-executable information files from the one or more digital information sources 106 that matches the one or more parameters of relevance for the workflow task 114 as identified and crawled by the navigation engine 206.

The computerized data collection wireless appliance 208 may perform certain data collection tasks digitally to extract computer-executable information files from the one or more digital information sources 106 that matches the one or more parameters of relevance for the workflow task 114. In the example described herein, the computerized data collection wireless appliance 208 may be permitted to generate and/or collect data from the information sources 106 that are connected to the network 110 and permitted to be accessed by the processor 202 or associated entity such as an organization. The network 110 may be a wireless or a physical network configured to operate as a peer network in some embodiments or a global internetwork.

The data collection wireless appliance 208 or the processor 202 may be coupled communicatively with a local data reservoir 226 such that data collection wireless appliance 208 may be configured to collect, store, and digitally manage data in the local data reservoir 226 that is extracted or collected from the information sources 106 in context of the workflow task 114 that may be a computer-executable task in some embodiments.

The information processing engine 210 that is communicatively coupled to the computerized data collection wireless appliance 208 is configured to digitally process the collected computer-executable information files into a plurality of processed information blocks. The process of transformation of the collected computer-executable information files into the processed information blocks may involve a series of steps such as including, without limitations, meta tagging of the information files, summarizing the information files, curation, high level relevancy analysis for the workflow task 114, through an automated process with or without utilizing one or more operations by the AI/ML system 214, and the like.

The micro-content blocks creator 212 of the processor 202 is configured to generate the one or more contextual micro-content blocks 116 from the plurality of processed information blocks based on the output generated by the context sensing engine 204 and/or the AI/ML system 214 indicative of the one or more contextual patterns derived from the context inputs received in real-time or in advance from the workflow task 114 scenarios, associated user, and the associated user device 306. The processing circuit 202 may further include a filtering circuit 232 configured to filter the plurality of processed information blocks based on the one or more contextual patterns and the processed content inputs associated with the user as indicative through the output generated by the context sensing engine 204 and/or the AI/ML system 214 communicatively coupled to the processing circuit 202. This may allow more accurate and relevant information to be used for generating the micro-content blocks 116.

The filtering circuit 232 removes redundant or unwanted information from an information stream (such as the processed information blocks) using automated or computerized methods prior to presentation to the user in the form of the micro content blocks. The filtering circuit 232 manages the information overload and increment of the semantic signal-to-noise ratio. The filtering circuit 232 compares the processed information blocks with certain reference characteristics such as the contextual pattern to determine what is noise versus what is important for a particular workflow task or a series of micro tasks.

The one or more micro-content blocks 116 may include context-based micro-content blocks that are generated in view of the nature of the workflow task 114 and the situation in which the workflow task 114 is being executed and the various micro-tasks associated with the workflow task 114 and the nature of each micro-task thereof. The one or more micro-content blocks 116 may include the location-based micro-content block 124 that is generated in view of the location of actual execution of the workflow task 114. The one or more micro-content blocks 116 may include the role-based micro-content block 120 that is generated in view of the role of the user in performance of the workflow task 114. The one or more micro-content blocks may include the skills-based micro-content block 122 that is generated in view of the skill-sets of the user. Many additional types of micro-content blocks 116 may be generated without limitations.

In an example, the various micro-content blocks 116 may include information elements extracted from the processed information blocks by mapping onto each micro-task for relevancy, role of the user interacting for executing a specific micro-task for relevancy, level of experience or skill sets of the user for a particular micro-task that is contained within the workflow task 114 such that the one or more contextual micro-content blocks 116 match to the plurality of micro-tasks of the workflow task. Therefore, the various micro-content blocks 116 provides a set of structured digital information blocks that are relevant and related and deeply maps onto various micro-tasks when looked in association with the skillets of the user, location of the user, nature of micro-tasks and the overall workflow task 114, role of the user in various micro-tasks, and the like. This may permit providing relevant information to the user when a particular task such as the workflow task 114 is performed such that even if the user is not very familiar with how to perform the workflow task 114, the user device 306 may be permitted to receive necessary inputs from the processor 202 in terms of the micro-content blocks 116 that guides the user about the task execution not only at a broad level but at specific micro steps or micro-tasks levels.

Each micro step or micro-task may be of a few seconds or minutes duration or may be longer. The duration of a micro-task may depend on the level of guidance it needs as a standalone step independent of other steps or micro-tasks. The workflow task 114 may be broken into the micro-tasks based on the level of guidance a portion of the entire workflow task 114 may require for the user to effectively execute it. For example, a task may involve a series of five steps such that the first step involves understanding a particular function in order to start a medical device, while the remaining four steps are merely to monitor the different values generated by the device. In an example, the task may be broken into two micro-tasks: a first micro-task involving the first step, and a second micro-task involving the remaining four steps. In an embodiment, each step may be defined by a separate micro-task or more than one micro-task. The procedure of determining the various micro-tasks based on the workflow task 114 is performed by a task manager 228.

The task manager 228 may be configured to manage various tasks such as delivery of the micro content blocks in accordance with schedule of the workflow task 114. The task manager 228 is communicatively coupled to the processing circuit 202. The task manager 228 may schedule the delivery of the micro-content blocks 116 according to schedule of the tasks and the associated micro-tasks and accordingly tie different tasks on a time series and identifies timelines associated with the delivery of the micro-content blocks 116 for the different tasks.

The task manager 228 examines the status of the micro-tasks on the time series and generates an automated output indicative of the task's status and respective micro-content blocks delivery. The task manager 228 may automatically notify to the user about status of the micro-content blocks delivery for the tasks as soon as they are delivered and/or their tasks are complete or if the delivery is pending after due time. The task manager 228 may, in general, organize scheduling of the tasks as they are to occur and accordingly connect with other systems and components for allowing the delivery of the micro-content blocks 116 without any delay and/or conflict.

In an embodiment, the task manager 228 may serve as a command center and can track activities of the users such as who is reading, who is learning, and who is spending what time on what content as indicated through tracking of the time spent by the users on the different micro-content blocks 116 delivered to them. Accordingly, intelligent recommendations may be sent to the users based on their education habits and those items that are more useful to their activities and tasks.

The micro-content blocks 116 that match and are related precisely to specific micro-tasks associated with the workflow task 114 are communicated by the processor 202 to the user device 306. The micro-content communication component 230 of the processor 202 transmits the one or more contextual micro-content blocks relating to the specific micro-tasks of the workflow task 114 to the user device 306 associated with the user at a time when the workflow task 114 or a micro-task is about to occur. The one or more contextual micro-content blocks 116 may be time-stamped before transmission to the user device 306 associated with the user for real-time delivery according to the occurrence of the plurality of micro-tasks.

In various examples, the information sources 106 may be hosted by applications such as websites or electronic applications or mobile applications or computing machines associated with third-party companies or third-party vendors (or merely third parties for simplicity of description). The information blocks obtained from the information sources 106 may be transformed into the micro-content blocks 116 based on context data analysis, application data analysis, user data analysis, AI/ML by the information management server 104 so as to generate necessary information presentable on a user screen in the form of the micro-content blocks 116 by the information management server 104.

The recorded or monitored context sensitive, application sensitive, or user sensitive information (together referred to as contextual data or information or context sensitive data or information or contextually sensitive data or information) by the front-end context monitoring appliance 310 may be supplied to the information management server 104 for further processing of the information and generating and delivering the micro-content blocks 116 to the user device 306 as discussed above. The contextual data monitored by the front-end context monitoring appliance 310 may change with time and may also be different for different tasks.

In some embodiments, the computerized data collection wireless appliance 208 may be configured to perform certain data collection tasks within the network 110 digitally. In an example, the computerized data collection wireless appliance 208 may be permitted to generate and/or collect data from various devices such as medical devices, web pages, local data repositories, etc. together referred to as the information sources 106 that operate within the network 110. The computerized data collection wireless appliance 208 may be configured to collect, store, and digitally manage data at the information management server level that is extracted or collected from the information sources 106.

The network 110 may broadly represent one or more LANs, WANs, cellular networks (e.g., LTE, HSPA, 3G, and other cellular technologies, etc.), global internet, and/or networks using any of wired, wireless, terrestrial microwave, or satellite links, and may include the public Internet.

In FIG. 2, a network layer 236 may be provided that may use a push gateway system 238 and/or a pull gateway system 240 to collect the data from the information sources 106. In the pull gateway system 240, the network layer 236 may be permitted to send or ask queries to the information sources 106. In response to the queries, a computer-executable file containing information may be pulled in by the network layer 236 from the information sources 106. In the push gateway system 238, the network layer 236 may monitor various data elements at the information sources 106 and the information sources 106 may push relevant data in the form of the computer-executable files into the network layer 236 to get transferred to a central database or a local data reservoir 226.

The data collected from the information sources 106 may be stored in the local data reservoir 226 either for a small period of time just before it gets processed by the processor 202 or for a longer time such as a retention period as necessary.

The devices or machines that may generate the digital data extracted by the computerized data collection wireless appliance 208 or its components (exporters) thereof may include such as medical devices, FHIR-capable systems (EHRs), HL7-capable systems (EHRs or electronic health record systems), Non-HL7/FHIR EHRs, etc., source databases, safety/error reporting systems, global web pages, social media posts, local data repositories and the like.

Figure 4:
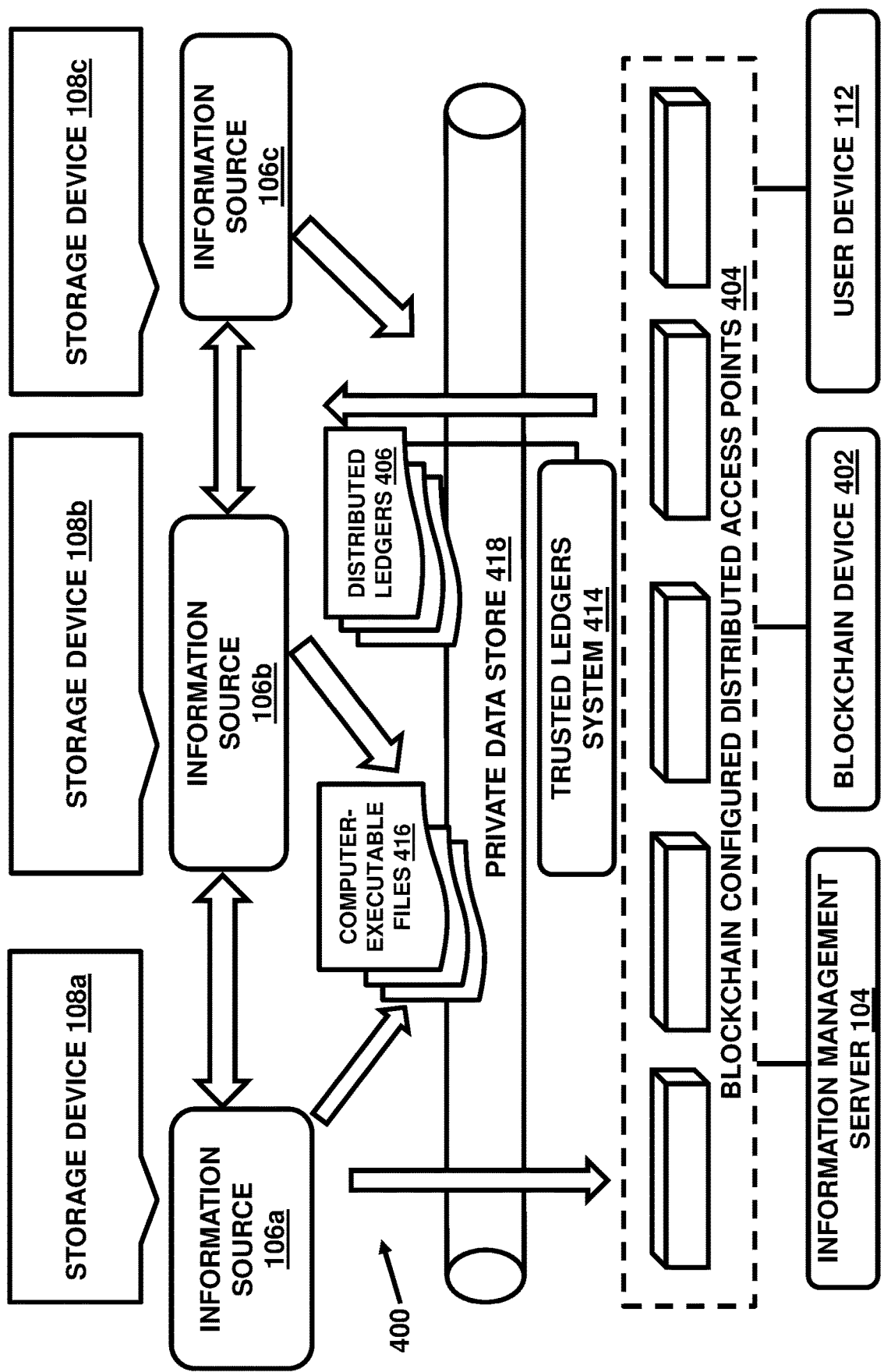
FIG. 4 illustrates a blockchain-configured ecosystem architecture containing one or more components of the system of FIG. 1 in accordance with an embodiment herein.

FIG. 4, with reference to FIGS. 1 through 3, illustrates an exemplary blockchain-configured ecosystem architecture 400 containing one or more components of the system 102 and also contain additional components so as to allow integrity of transactions and the digital data (including the information blocks and the micro-content blocks) shared/processed during the transfer or storage as discussed above in the document. The blockchain-configured ecosystem architecture 400 may provide a crowdsourced integrity network for storing the data accessed or extracted or transformed for sharing or storing across the network 110 instead of locally stored information by different participants or databases that may be tampered with.

The ecosystem architecture 400 may be blockchain-configured involving various blockchain devices. For example, the information management server 104 may interact with a blockchain device 402 through a plurality of blockchain configured distributed access points 404. A network that facilitates interaction across all components may be a blockchain integrity network. The blockchain network may build trust among the various participants or entities or systems or components thereof and their associated computing terminals or devices even if the devices/terminals or machines etc. may not "know" one another. The blockchain network may allow connections and transactions and recording and sharing of the data, information blocks, micro-content blocks, and various codes/token generated during an entire transaction including service tokens and authorization tokens in a trusted mode. A record of transactions and sharing and data from various terminals/devices stored on the blockchain in the form of computer-executable distributed ledgers 406 may provide proof to command the necessary trust among the terminals/devices (such as those associated with various participants/nodes etc. without limitations) to cooperate through a peer-to-peer or peer-to-client distributed digital ledger technology system. The ecosystem architecture 400 may include a distributed trusted ledgers system 414 containing the distributed blockchain ledgers 406 associated with a plurality of computing terminals and devices such that each ledger stores a copy of computer-executable files 416 containing the context inputs, context patterns, microcontent blocks, information blocks, information extracted from the information sources 106, and various other details corresponding to the tasks such as the workflow task 114 and the trust notes for defining security and trust among the computing terminals and devices across the network so that each computing terminal trusts the other computing terminal through the blockchain. The distributed ledgers system 414 enables coding of rules-based contracts that execute when specified conditions are met. The distributed ledgers 406 make it easier to create cost-efficient networks where any device or any evidence associated with a task execution or transaction may be tracked, without requiring a central point of control.

The various computing terminals or devices in the network serve as distributed peer-to-peer nodes and connections. The information management server 104 and its components thereof may be configured to perform the task of processing the context inputs and the information blocks further through the blockchain network based on the rules as defined and discussed herein. Each terminal/device/node in the ecosystem architecture 400, etc. may receive a copy of the blockchain which may get downloaded automatically upon joining the blockchain integrity network. Every permissioned node or the device in the network is an administrator of the blockchain, and may join the network voluntarily so that the network is decentralized.

The blockchain may eliminate the risks that come with data being held centrally by storing data across the network which may include the computer-executable files 416 containing the information blocks, context inputs, context patterns, etc. and/or the various tokens/codes including transaction codes. The blockchain security use encryption technology and validation mechanisms for security and integrity verification. The security may be enabled through public and private keys. A public key may define a user's address on the blockchain. The private key may give its owner an access to various digital assets in the network.

In an embodiment, the distributed ledgers 406 may enable coding of smart contracts (with the use of such as smart contract systems) that will execute when specified conditions are met. These smart contracts may protect various information pieces associated with the service deliveries and other transactions and data processing/storage and eliminate the risk of files copying and redistribution without protecting privacy rights.

The blockchain-configured ecosystem architecture 400 may provide a private view for the various devices and the entities operating in the network through the private data store 418 so that each permissioned device such as the information management server 104 may privately access the computer-executable files 416 associated with a task based on various policies such as based on their respective identities. The information management server 104 may access the computer-executable files 416 through the dedicated private data store 418 available through the plurality of distributed blockchain-configured access points 404, which may be enabled in the form of distributed blocks as shown in FIG. 4, with each block providing the ability to access the features of the blockchain-configured ecosystem architecture 400 by different terminals and devices at the same time based on defined and granted access rights.

The private data store 418 may provide a virtual storage to facilitate interaction, information exchange, reviewing, and presentation of the computer-executable files 416. For example, the private data store 418 may allow a virtual storage and presentation of only limited executable files or portions of the executable files for access by particular entities or participants in accordance with permissions granted for reviewing. The private data store 418 may be configured to auto-hash review interactions at any required interval. This compartmentalization of the computer-executable files 416 ensures that the computer-executable files 416 are secured and private as per access rights authorized to the nodes. The data presented on the private data store 418 of the blockchain serves as a secure way to ensure that the private data store 418 is in sync with any permissioned access.

In an embodiment, the blockchain-configured digital ecosystem architecture 400 may provide a federated blockchain comprising of several entities/participants (including the user) and their associated computers and devices (such as the user device 306) and sensors that jointly interact to process transfers of data through a trusted, secured and distributed network of the blockchain-configured access points 404.

The various components described herein and/or illustrated in the figures may be embodied as hardware-enabled modules and may be a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that include electronic circuits process computer logic instructions capable of providing digital and/or analog signals for performing various functions as described herein. The various functions can further be embodied and physically saved as any of data structures, data paths, data objects, data object models, object files, database components. For example, the data objects could include a digital packet of structured data. Example data structures may include any of an array, tuple, map, union, variant, set, graph, tree, node, and an object, which may be stored and retrieved by computer memory and may be managed by processors, compilers, and other computer hardware components. The data paths can be part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be physical locations in computer memory and can be a variable, a data structure, or a function. Some examples of the modules include relational databases (e.g., such as Oracle® relational databases), and the data objects can be a table or column, for example. Other examples include specialized objects, distributed objects, object-oriented programming objects, and semantic web objects. The data object models can be an application programming interface for creating HyperText Markup Language (HTML) and Extensible Markup Language (XML) electronic documents. The models can be any of a tree, graph, container, list, map, queue, set, stack, and variations thereof, according to some examples. The data object files can be created by compilers and assemblers and contain generated binary code and data for a source file. The database components can include any of tables, indexes, views, stored procedures, and triggers.

In an example, the embodiments herein can provide a computer program product configured to include a pre-configured set of instructions, which when performed, can result in actions as stated in conjunction with various figures herein. In an example, the pre-configured set of instructions can be stored on a tangible non-transitory computer readable medium. In an example, the tangible non-transitory computer readable medium can be configured to include the set of instructions, which when performed by a device, can cause the device to perform acts similar to the ones described here.

The embodiments herein may also include tangible and/or non-transitory computer-readable storage media for carrying or having computer-executable instructions or data structures stored thereon. Such non-transitory computer readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network. If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
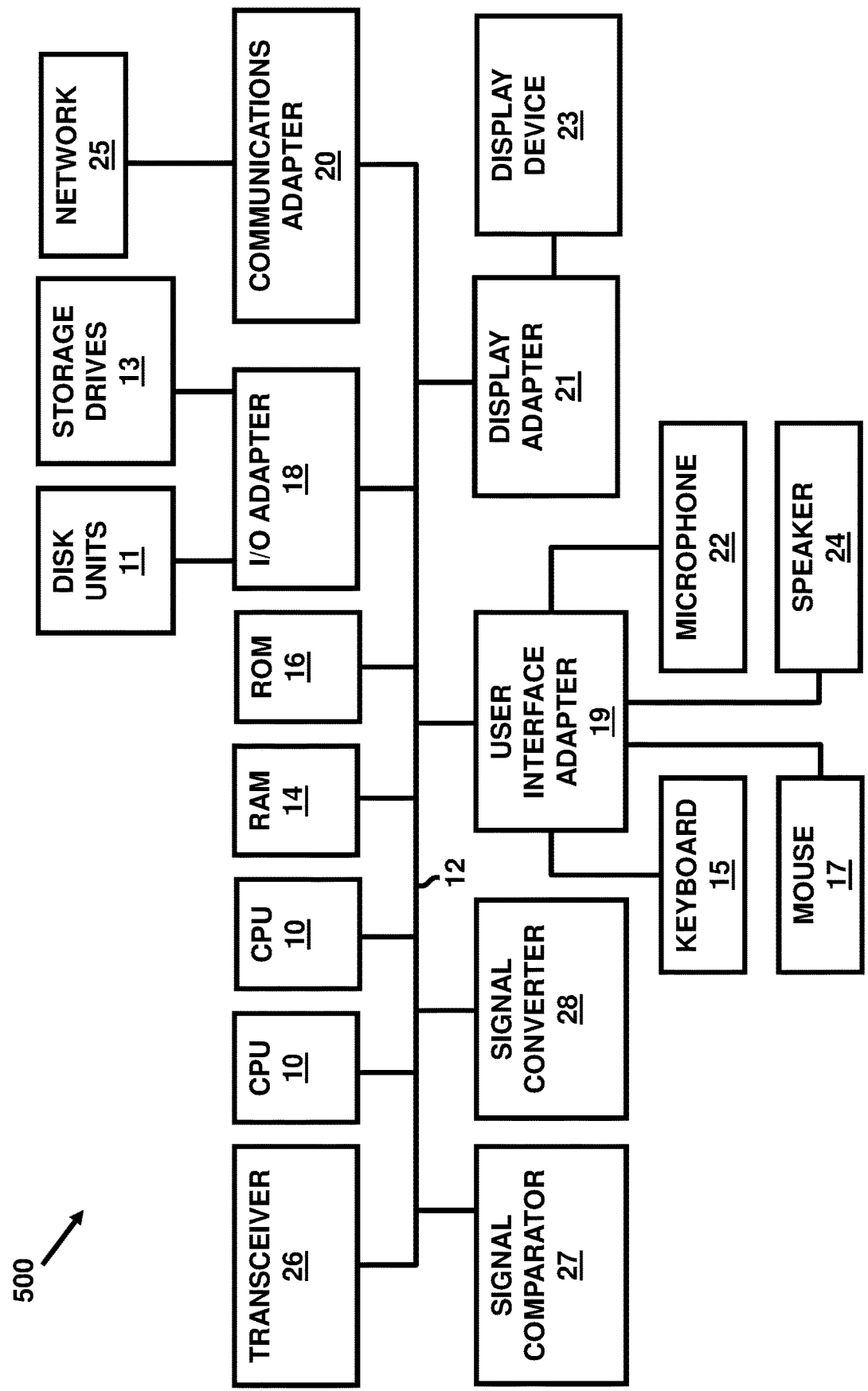
FIG. 5 is a block diagram illustrating a computer system used in accordance with the embodiments herein.

A representative hardware environment for practicing the embodiments herein is depicted in FIG. 5, with reference to FIGS. 1 through 4. This schematic drawing illustrates a hardware configuration of an information handling/computer system 500 in accordance with the embodiments herein. The system 500 comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system 500 can read the inventive instructions on the program storage devices and follow these instructions to execute the methodology of the embodiments herein. The system 500 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network, and a display adapter 21 connects the bus 12 to a display device 23 which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for live digital streaming of one or more contextual micro-content blocks in real-time for a workflow task to facilitate task performance by a user, wherein the method comprises:
   navigating through one or more digital information sources accessible over a network and searches for information that matches one or more parameters of relevance for the workflow task;
   extracting computer-executable information files from the one or more digital information sources that matches the one or more parameters of relevance for the workflow task;
   digitally processing the extracted computer-executable information files into a plurality of processed information blocks;
   generating one or more contextual micro-content blocks from the plurality of processed information blocks; and
   transmitting the one or more contextual micro-content blocks relating to the workflow task to a device associated with the user at a time when a plurality of micro-tasks of the workflow task are about to start.

2. The method of claim 1, comprising:
   digitally processing one or more context inputs associated with the user;
   converting the one or more context inputs into processed inputs; and
   generating an output based on the one or more context inputs received from a front-end context monitoring appliance.

3. The method of claim 2, comprising:
   receiving a signal containing the context inputs and the output generated based on the context inputs;
   digitally processing the context inputs to determine a contextual pattern for the workflow task utilizing a plurality of intelligent and machine learning-based tools; and
   transmitting a digital signal containing information pertinent to the contextual pattern to the device associated with the user.

4. The method of claim 3, comprising filtering the plurality of processed information blocks based on the contextual pattern associated with the user and the workflow task.

5. The method of claim 2, wherein the front-end context monitoring appliance comprises an agent device operatively coupled with the context sensing engine.

6. The method of claim 5, wherein the agent device is operated by deploying an installable agent, configured as a browser plugin, at the device associated with the user.

7. The method of claim 1, comprising:
   detecting a context of the task performance; and
   detecting geographical coordinates of the device associated with the user.

8. The method of claim 1, wherein the one or more micro-content blocks comprises at least one of a context-based micro-content block, a location-based micro-content block, a role-based micro-content block, and a skills-based micro-content block such that the one or more contextual micro-content blocks matches to a plurality of micro-tasks of the workflow task.

9. The method of claim 1, wherein the one or more contextual micro-content blocks are time-stamped before transmission by the micro-content communication component to the device associated with the user for real-time delivery according to an occurrence of the plurality of micro-tasks of the workflow task.

10. The method of claim 1, comprising defining the one or more parameters of relevance based on one or more of a plurality of digital inputs stored in a memory device, wherein the plurality of digital inputs comprising a digital input indicative of nature of the workflow task, wherein the digital input indicative of at least one of specific micro-tasks associated with the workflow task, location of execution or performance of the workflow task, actor performing the task, a digital input indicative of context of the workflow task, skill-sets of the actor performing the workflow task, and role of the actor performing the workflow task.

11. The method of claim 1, comprising retrieving real-time tracking location coordinates associated with an event occurrence for the plurality of micro-tasks of the workflow task.

12. A system for live digital streaming of one or more contextual micro-content blocks in real-time for a workflow task to facilitate task performance by a user, wherein the system comprises:
   an information management server connected to a plurality of user devices associated with a plurality of users, wherein each of the user devices performs the workflow task at a particular time and location such that performance of the workflow task occurs at a location remote from a location of the information management server, and wherein the workflow task comprises a plurality of micro-tasks performed in a particular sequence at particular locations and particular time slots, wherein the information management server comprises a processor to:

navigate through a plurality of information sources distributed remotely from one another and storing digital files executable by the information management server in a plurality of respective storage devices;

monitor and receive details pertinent to the workflow task based on certain inputs received from at least one of the user devices and certain automated transfer of digital messages from the user devices; and transmit one or more micro-content blocks to the user device based on at least one of the inputs received and the digital messages, wherein the micro-content blocks indicate the workflow task along with the respective micro-tasks and a context of the user device, user, and the performance of the workflow task.

13. The system of claim 12, wherein the one or more micro-content blocks comprises: at least one of a context-based micro-content block, a location-based micro-content block, a role-based micro-content block, and a skills-based micro-content block such that one or more contextual micro-content blocks matches to a plurality of micro-tasks of the workflow task.

14. The system of claim 12, wherein the micro-content blocks comprise information elements generated by mapping onto each micro-task for relevancy, a role of the user interacting for executing a specific micro-task for relevancy, and a level of experience or skill sets of the user for a particular micro-task that is contained within the workflow task such that one or more contextual micro-content blocks match to the plurality of micro-tasks of the workflow task.

15. The system of claim 12, wherein the micro-content blocks comprise a set of structured digital information blocks that are relevant and related and deeply maps onto various micro-tasks when looked in association with skillets of the user, a location of the user, a nature of the micro-tasks and an overall workflow task, and a role of the user in various micro-tasks.

16. The system of claim 12, comprising a blockchain device that interacts with the information management server through a plurality of blockchain configured distributed access points over a blockchain network.

17. The system of claim 16, wherein the blockchain device comprises a distributed trusted ledgers system containing a plurality of distributed blockchain ledgers associated with a plurality of computing terminals such that each ledger stores a copy of a computer-executable file containing context inputs and the one or more contextual micro-content blocks associated with the workflow task.

* * * * *